Patented Oct. 31, 1933

1,932,591

UNITED STATES PATENT OFFICE 1,932,591

COMPOUNDS OF THE DIBENZPYRENE-QUINONE SERIES

Georg Kränzlein, Frankfort - on - the - Main - Höchst, Arthur Wolfram, Frankfort-on-the-Main - Rödelheim, and Emil Hausdörfer, Hofheim in Taunus, Germany, assignors to General Aniline Works, Inc., New York, N. Y., a corporation of Delaware No Drawing. Application November 4, 1930, Serial No. 493,464, and in Germany November 22, 1929

5 Claims. (Cl. 260—61)

The present invention relates to new compounds of the dibenzpyrenequinone series.

More particularly our present invention relates to the new compounds of the following general formula:

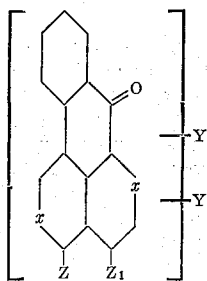

wherein Z and $Z_1$ jointly represent the grouping

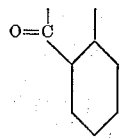

and Y represents hydroxy, O-alkyl, O-aryl, O-aralkyl or $SO_3H$ occupying positions other than those marked by an $x$ in the formula, and wherein the aromatic nuclei may be further substituted.

Our new compounds are obtainable for instance by subjecting a dibenzpyrenequinone compound to the action of a sulfonating agent as, for instance, concentrated sulfuric acid or oleum and replacing, if desired, in the sulfonated products thus obtained the sulfonic acid groups by hydroxy groups which process can be carried out by means of any known method as, for instance, by a treatment with caustic alkali. The dihydroxy compounds thus obtained can be converted into the corresponding ethers as, for instance, into the alkoxy or aralkoxy compounds by the usual methods.

As etherifying agent one may use in our process preferably p-toluene-sulfonic acid alkyl ester.

The compounds thus obtained may be halogenated by the usual methods whereby products are obtainable the shades of which are changed in comparison with the parent material.

The temperatures at which the sulfonation process mentioned before is preferably carried out depend partly upon the strength of the sulfonating agent used, for instance, when sulfonating with oleum of 20 per cent strength the reaction may be carried out at temperatures of about 140°–150° C.

The alkaline melting process of the sulfonic acid compounds may be carried out at temperatures from about 270° C. to about 310° C. The etherifying process of the said hydroxy compounds is preferably carried out at temperatures from about 100° C. to 200° C.

The new vat dyestuffs obtainable according to our process are in the dry state crystalline powders and dissolve in concentrated sulfuric acid from a brown to blue to greenish blue solution.

The following examples serve to illustrate the invention, but they are not intended to limit it thereto, the parts being by weight:

(1) 100 parts of 3.4.8.9-dibenzpyrenequinone of the following formula:

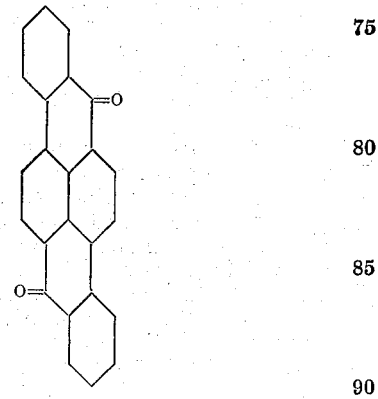

are dissolved at ordinary temperature in 1000 parts of fuming sulfuric acid of 20 per cent strength with or without addition of sodium sulfate or similar diluents and the whole is heated to 140° C.–145° C. until a test-portion completely dissolves in water. The mixture is poured into water and the boiling solution is salted out by means of sodium chloride. The sodium salt of the disulfonic acid thus obtained has an orange-yellow color and is rather difficultly soluble in water. It dissolves in concentrated sulfuric acid to a red solution.

50 parts of the dry di-sodium sulfonate are introduced at 120° C.–150° C. into a melt of 300 parts of potassium hydroxide, if desired with addition of arsenic acid, and 30 parts of water. Thereupon, the temperature is slowly raised to 300° C. while well stirring. At 280° C. the reaction sets in with frothing. The finished melt is dissolved in water and, in the heat, air is blown through the hot solution. The solution is acidified and there is obtained a dark brown dihydroxy-3.4.8.9-dibenzpyrenequinone which is soluble in the heat in dilute caustic soda solution to a violet-blue solution and in concentrated sulfuric acid to a cyaneous solution.

50 parts of this dihydroxy-3.4.8.9-dibenzpyrenequinone are heated to boiling together with 50 parts of sodium carbonate in 500 parts of nitrobenzene until the water is distilled off completely. At 180° C. 100 parts of para-toluene sulfonic acid methyl ester are added by and by whereby the mixture gradually dissolves to a reddish brown solution. When the reaction is finished, the solution is filtered while hot and there crystallizes from the nitrobenzene mother liquor in the form of beautiful reddish brown needles the methoxy-3.4.8.9-dibenzpyrenequinone of the following probable formula:

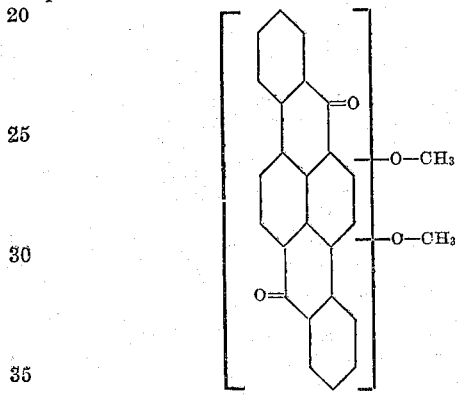

It dissolves in concentrated sulfuric acid to a decidedly more greenish blue solution than the dihydroxy-3.4.8.9-dibenzpyrenequinone and dyes cotton from a clear red vat a scarlet tint of excellent fastness properties.

The methylation may also be carried out by means of dimethyl sulfate in the presence of water.

(2) 100 parts of the dihydroxy-3.4.8.9-dibenzpyrenequinone obtainable according to Example 1 in 1000 parts of chlorsulfonic acid are mixed with 66 parts of bromine at ordinary temperature and stirred until the bromine has been used up completely. Thereby the solution which is at first violet rather quickly assumes a greenish blue coloration. The brominated dihydroxy-3.4.8.9-dibenzpyrenequinone thus obtained has the following probable formula:

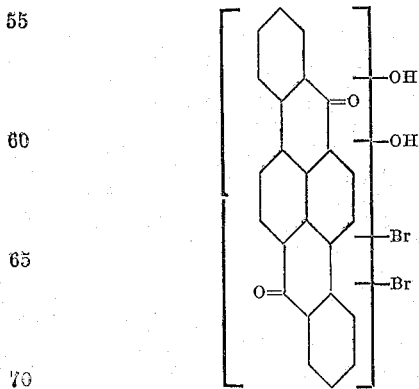

It is a dark brown product, it dissolves in concentrated sulfuric acid with a bluish green color, it easily dissolves in dilute caustic soda solution to a violet solution and dyes cotton from a wine red vat a brown tint sensitive to alkalies.

50 parts of the said brominated dihydroxy-3.4.8.9-dibenzpyrenequinone are heated to boiling together with 50 parts of sodium carbonate in 500 parts of nitrobenzene until the water has been removed completely. 100 parts of para-toluene sulfonic acid methyl ester are then added at 180° C.; the methoxy derivative formed thereby which has the following probable formula:

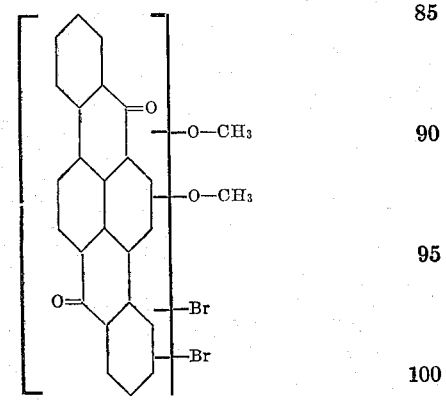

separates in the form of copper-red thin leaflets and is filtered off after the reaction is finished. It is insoluble in organic solvents; it dissolves in concentrated sulfuric acid to a more greenish solution than the non-methylated products. It dyes cotton from a violetish red vat a salmon-colored tint.

(3) 100 parts of 4.5.8.9-dibenzpyrenequinone of the following probable formula:

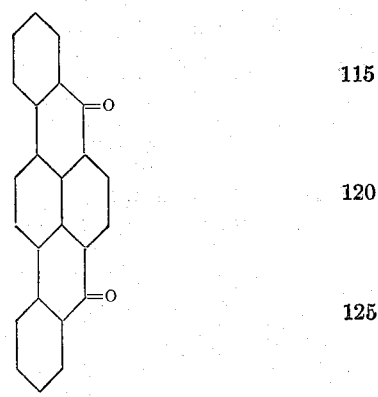

are dissolved at ordinary temperature in 1000 parts of fuming sulfuric acid of 20 per cent strength and sulfonated at 80° C.

The whole is poured into water, the boiling solution is salted out by means of sodium chloride and there is obtained the deep red sodium salt of the disulfonic acid which is scarcely soluble in water but dissolves in concentrated sulfuric acid to a beautiful bluish green solution.

50 parts of dry sodium salt of 4.5.8.9-dibenzpyrenequinone disulfonic acid are introduced at 150° C. into a melt of 300 parts of potassium hydroxide and 30 parts of water and, while well stirring, the temperature is slowly raised to 280° C. When the reaction is finished, the melt thus obtained is dissolved in water and air is blown through the hot solution. There is obtained the green sodium salt of dihydroxy 4.5.8.9-dibenzpyrenequinone, scarcely soluble in water and alkali, which is directly filtered off from the solution and washed until neutral. The free dihydroxy compound is violet and dissolves in concentrated sulfuric acid to a yellowish brown solution.

The product is methylated as described in Example 1 and there is obtained the violet dimethoxy-4.5.8.9-dibenzpyrenequinone which corresponds with the following probable formula:

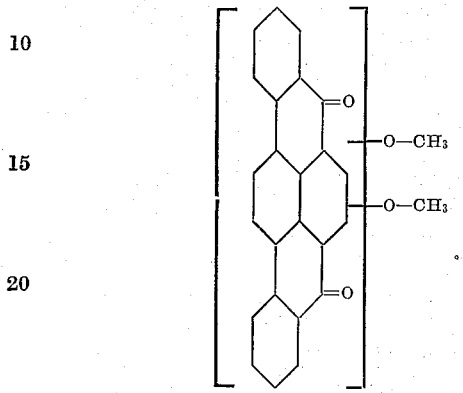

It can easily be recrystallized from nitrobenzene and dissolves in concentrated sulfuric acid to a brownish orange solution. It dyes cotton from a reddish yellow clear vat violet tints. The dyeings thus obtained have very good fastness properties; they are especially fast to water-drops.

(4) 98 parts of dimethoxy-3.4.8.9-dibenzpyrenequinone are suspended in 2000 parts of nitrobenzene. 10 parts of iodine and 90 parts of bromine are added thereto and the whole is heated, while stirring, to 100° C. for 80 hours. After cooling the brominated product is filtered by suction, washed with alcohol and dried. It is insoluble in nitrobenzene so that it can be purified from the non-brominated product which may be present by extraction with boiling nitrobenzene.

According to the analysis the product obtained is a dibromo-dimethoxy-3.4.8.9-dibenzpyrenequinone. It corresponds with the following probable formula:

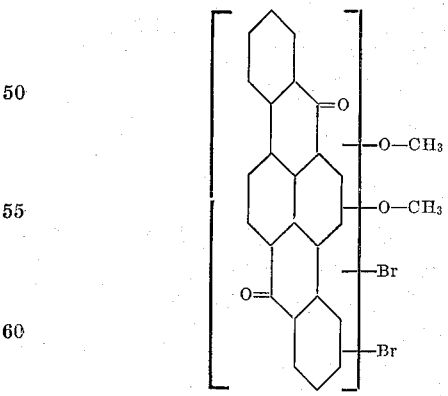

It dissolves in concentrated sulfuric acid to a greenish blue solution and dyes cotton from a wine red vat feebly salmon-colored tints.

(5) 50 parts of the dihydroxy-3.4.8.9-dibenzpyrenequinone obtainable according to Example 1 are heated to boiling together with 50 parts of sodium carbonate in 500 parts of nitrobenzene until the water which has been formed is distilled off completely. Thereupon 100 parts of para-toluene sulfonic acid ethyl ester are gradually introduced at 180° C. When the reaction is finished, the hot solution is filtered with suction. The diethoxy-3.4.8.9-dibenzpyrenequinone of the following probable formula:

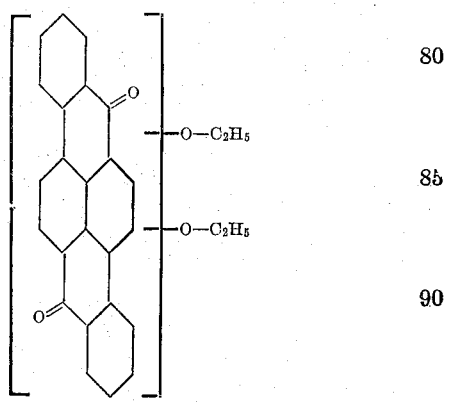

crystallizes from the mother liquor in the form of dark brown beautiful crystals having a metallic greenish lustre. It dissolves in concentrated sulfuric acid to a blue solution and dyes cotton from a wine red vat orange tints.

(6) By causing para-toluene sulfonic acid ω-chlorethyl-ester to act upon dihydroxy-3.4.8.9-dibenzpyrenequinone in the same manner, the di-ω-chlorethoxy-3.4.8.9-dibenzpyrenequinone of the following probable formula:

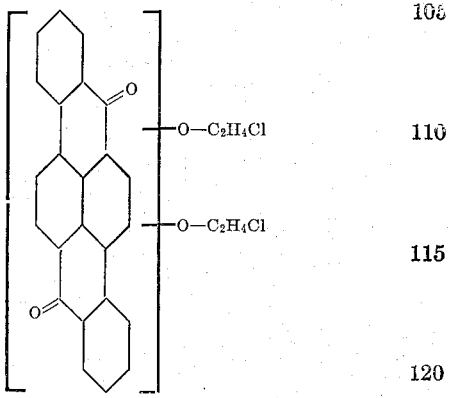

is obtained in the form of brownish crystals having a greenish metallic lustre. The product obtained dissolves in concentrated sulfuric acid to a blue solution and dyes cotton from a red vat red tints.

(7) By causing para-toluene sulfonic acid propylester to act upon dihydroxy-3.4.8.9-dibenzpyrenequinone there is obtained the dipropylether of dihydroxy-3.4.8.9-dibenzpyrenequinone of the following probable formula:

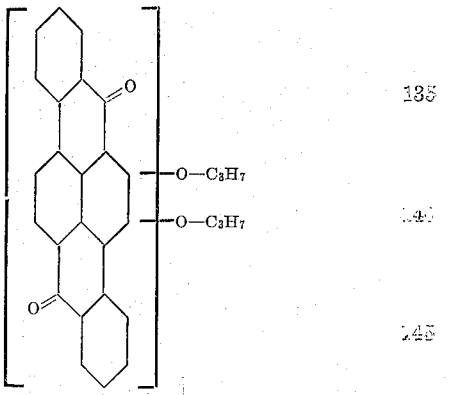

in the form of laminæ having a copperly lustre. It dissolves in concentrated sulfuric acid to a more greenish blue solution than the dimethylether obtainable according to Example 1. It yields a red vat of a more bluish hue and dyes cotton more orange red tints than the said dimethylether.

(8) The dibutylether of dihydroxy-3.4.8.9-dibenzpyrenequinone which corresponds with the following probable formula:

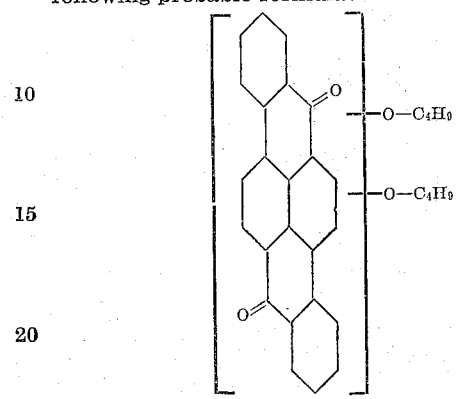

(obtainable from para-toluene sulfonic acid butylester and dihydroxy-3.4.8.9-dibenzpyrenequinone) has the same properties as the dipropylether obtainable according to Example 7.

(9) By causing para-toluene sulfonic acid isobutylester to act upon dihydroxy-3.4.8.9-dibenzpyrenequinone, there is obtained the di-isobutylether of dihydroxy-3.4.8.9-dibenzpyrenequinone of the following probable formula:

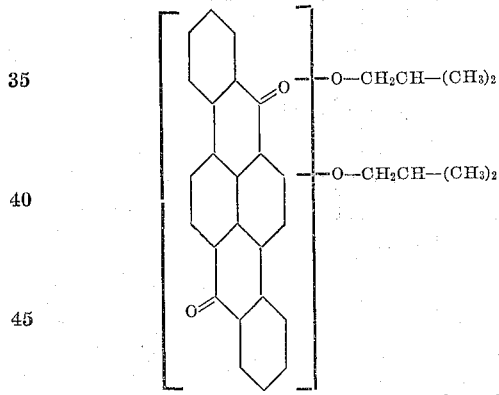

which crystallizes in the form of brick-red needles, dissolves in concentrated sulfuric acid to a greenish blue solution and dyes cotton from a red vat nearly the same tints as the ethers obtainable according to Examples 7 and 8.

(10) 100 parts of dihydroxy-4.5.8.9-dibenzpyrenequinone obtainable according to Example 3, dissolved in 1000 parts of chlorosulfonic acid, are mixed with 66 parts of bromine at room-temperature. The whole is stirred until the bromine has been used up completely. The brominated dihydroxy-4.5.8.9-dibenz-pyrenequinone of the following probable formula:

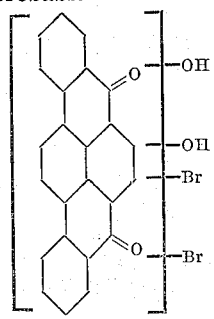

forms a violet product which dissolves in concentrated sulfuric acid to an orange brown solution. It is easily soluble in warm dilute caustic soda solution to a deep green solution. The vat is clear, blood red.

20 parts of the brominated dihydroxy-4.5.8.9-dibenzpyrenequinone are heated to boiling together with 20 parts of sodium carbonate in 200 parts of nitrobenzene until the water has been removed completely. Thereupon 40 parts of paratoluene sulfonic acid methylester are added at 180° C. When the reaction is finished, the methylated product which is insoluble in nitrobenzene is filtered with suction, while hot, washed with alcohol and water and extracted several times by boiling with nitrobenzene. The reddish violet methoxy derivative of the following probable formula:

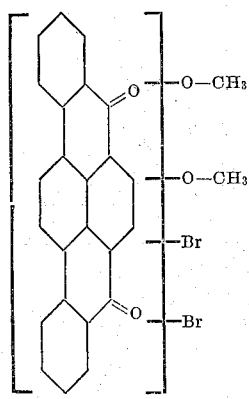

is insoluble in organic solvents; it dissolves in concentrated sulfuric acid to a brown solution, yields a red vat and dyes cotton reddish violet tints.

11. 50 parts of the dihydroxy-4.5.8.9-dibenzpyrenequinone obtainable according to Example 3 are boiled in the usual manner with 50 parts of sodium carbonate in 500 parts of nitrobenzene until the water has been removed completely whereupon 100 parts of toluene sulfonic acid ethyl ester are added in several portions at 180° C. When the reaction is finished, the hot solution is filtered with suction. From the mother liquor there crystallizes the diethoxy-4.5.8.9-dibenzpyrenequinone of the following probable formula:

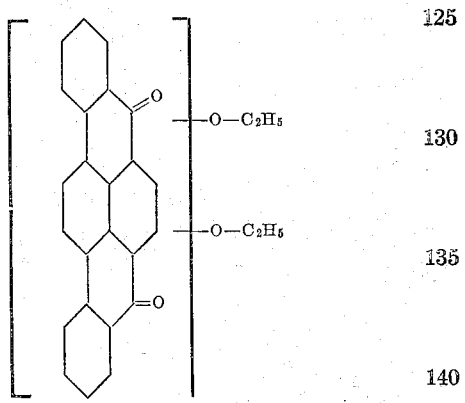

in the form of violet small crystals. It dissolves in concentrated sulfuric acid to a brownish orange solution and dyes cotton from a reddish yellow clear vat violet tints. The dyeings obtained are fast to water drops.

12. By causing para-toluene sulfonic acid ω-chlorethylester to act upon the dihydroxy-4.5.8.9-dibenzpyrenequinone a dark blue to violet product, the di-(ω-chlorethoxy)-4.5.8.9-dibenzpyrenequinone, is obtained which corresponds with the following probable formula:

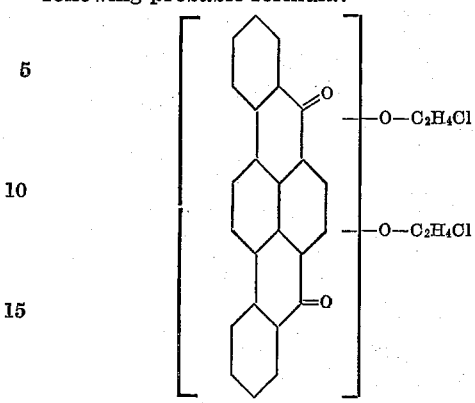

It dissolves in concentrated sulfuric acid to an orange brown solution and dyes cotton from an orange brown vat bluish violet tints.

We claim:

1. As new products, the compounds of the following general formula:

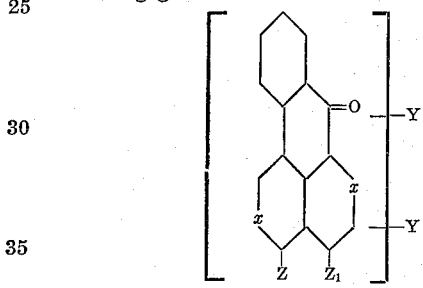

wherein Z and $Z_1$ jointly represent the grouping

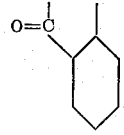

Y represents hydroxy, O-alkyl, O-aryl, O-aralkyl or $SO_3H$ occupying positions other than those marked by an $x$ in the formula and the aromatic nuclei may be further substituted by halogen, being vat dyestuffs forming in the dry state crystalline powders.

2. As new products, the compounds of the following general formula:

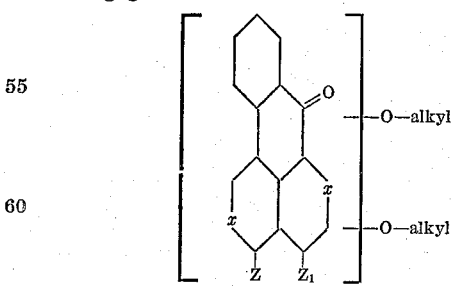

wherein Z and $Z_1$ jointly represent the grouping

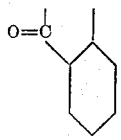

the two O-alkyl groups occupying positions other than those marked by an $x$ in the formula and the aromatic nuclei may be further substituted by halogen being vat dyestuffs forming in the dry state crystalline powders.

3. As a new product, the compound of the following probable formula:

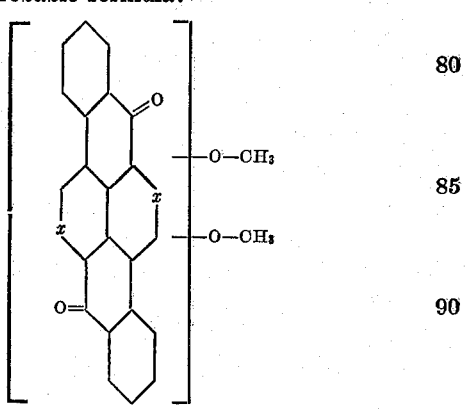

the two $O.CH_3$ groups occupying positions other than those marked by an $x$ in the formula being a vat dyestuff forming in the dry state brownish-red crystals dissolving in concentrated sulfuric acid to a blue solution.

4. As a new product, the compound of the following probable formula:

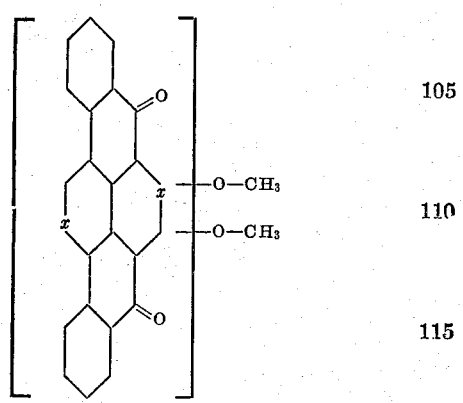

the two $OCH_3$ groups occupying positions other than those marked by an $x$ in the formula being a vat dyestuff forming in the dry state dark violet crystals dissolving in concentrated sulfuric acid to a brownish orange solution.

5. As a new product, the compound of the following probable formula:

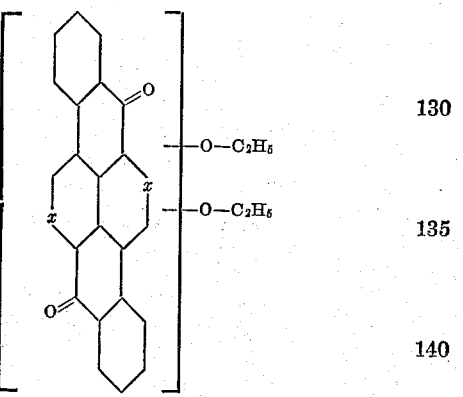

the two $O.C_2H_5$ groups occupying positions other than those marked by an $x$ in the formula being a vat dyestuff forming in the dry state round crystals dissolving in concentrated sulfuric acid to a blue solution.

GEORG KRÄNZLEIN.
ARTHUR WOLFRAM.
EMIL HAUSDÖRFER.